United States Patent
Gaspard

[11] Patent Number: 5,686,006
[45] Date of Patent: Nov. 11, 1997

[54] INDUCTION COOKER WITH COIL SUPPORT HAVING SPIRAL-SHAPED HOUSING FOR SPIRAL COIL

[75] Inventor: Jean-Yves Gaspard, Saran, France

[73] Assignee: C E P E M, St. Jean de la Ruelle, France

[21] Appl. No.: 559,046

[22] Filed: Nov. 15, 1995

[30] Foreign Application Priority Data

Nov. 15, 1994 [FR] France ................... 94 13653

[51] Int. Cl.⁶ ............................................. H05B 6/12
[52] U.S. Cl. ................ 219/622; 219/624; 219/676
[58] Field of Search ............................ 219/624, 622, 219/625, 626, 676, 675

[56] References Cited

U.S. PATENT DOCUMENTS

| | | | |
|---|---|---|---|
| 4,029,926 | 6/1977 | Austin | 219/624 |
| 4,467,162 | 8/1984 | Kondo et al. | 219/624 |
| 4,770,355 | 9/1988 | Mori et al. | 219/624 |

FOREIGN PATENT DOCUMENTS

| | | | |
|---|---|---|---|
| 0 158 353 | 10/1985 | European Pat. Off. . | |
| 0 565 186 | 10/1993 | European Pat. Off. . | |
| 2 659 725 | 9/1991 | France . | |
| 5-251167 | 9/1993 | Japan | 219/624 |

OTHER PUBLICATIONS

Patent Abstracts of Japan, vol. 013, No. 571 (E-862), 18 Dec. 1989 & JP-A-01 239791 (Fuji Electric Co Ltd), 25 Sep. 1989, *abridged*.

*Primary Examiner*—Philip H. Leung
*Attorney, Agent, or Firm*—Oblon, Spivak, McClelland, Maier & Neustadt, P.C.

[57] ABSTRACT

An induction cooking heater comprises an inductor, an inductor support comprising a magnetic material and a protective sheet positioned beneath the support in contact with this support. The support is made of a thermally conductive, electrically insulating material to enable the discharge of calorific energy from the inductor to the protective sheet. Furthermore, with the inductor taking the form of a strand of electrically conductive wires in spiral form, the support has a housing on its upper face that is also spiral shaped, adapted to receiving said strand and improving the thermal transfer.

13 Claims, 1 Drawing Sheet

INDUCTION COOKER WITH COIL SUPPORT HAVING SPIRAL-SHAPED HOUSING FOR SPIRAL COIL

BACKGROUND OF THE INVENTION

1. Field of the Invention

The present invention relates to an improvement in induction cookers.

The general principle of induction cooking consists in placing a container adapted to this type of cooking on top of an inductor supplied with a high-frequency electrical current. The magnetic field produced by the inductor generates a flow of currents by induction in the walls and the bottom of the container. The walls and the bottom of the container get heated and, by thermal conduction, provide for the heating and cooking of an item of food placed in the container.

The inductor is conventionally formed by at least one flat coil made by winding a strand of wires on itself in the form of a spiral which is generally circular and concentric. The supply of current into the coil is done by connecting the two free ends of the strand, one being at the center of the spiral and the other on the periphery, to the terminals of a generator delivering a high-frequency current.

The manufacture of inductors raises a certain number of problems at the present time.

First of all, it is very difficult to obtain a coil with a constant diameter for the strand itself does not have a constant section throughout its length. Indeed, each elementary wire forming the strand has to be surrounded by an insulator whose thickness is not controlled with precision.

Furthermore, the strands of wires, generally copper strands, that are used for known inductors have a large section typically in the range of 6 mm$^2$. This large section has a beneficial effect on the distribution and removal of losses from the coil of the inductor, the temperature of which should not exceed 200° C. for standard insulation of elementary wires. However, this large section has a significant effect on the total cost of an inductor.

The main aim of the present invention is to propose an induction cooking heater in which the inductor used has a constant diameter obtained from a strand whose section is considerably smaller than that of known inductors. This makes it necessary to remove the heat which becomes more difficult to convey owing to the smaller section of the strand.

The document U.S. Pat. No. 4,467,162 describes an induction cooking heater comprising an inductor, an inductor support made of magnetic material and a protective sheet positioned beneath the support, in contact with this support, one of the ancillary functions of this sheet being to dissipate the calories of the inductor.

The document EP-A-0 565 186 also describes an induction cooking heater comprising an inductive winding in the form of a rigid flat surface positioned vertically in a spiral groove hollowed out of the surface of the support. This cooking heater is suited only to low power values owing to problems of skin effect and the proximity of the load which means that the current migrates to the upper surface of the flat element. The useful volume in which the high-frequency currents flow is highly localized at the top of the conductor and very small. This gives rise to heating that limits the application of this device to low currents and hence low values of excitation power. This cooking heater also raises the problem of the holding of the rigid conductor wire in its housing for which there are provided fastening lugs which it is difficult to make out of a material that has to be both electrically insulating and heat-resistant.

SUMMARY OF THE INVENTION

An object of the present invention is an induction cooking heater of the type described in the document U.S. Pat. No. 4,467,162 wherein the support is made of a thermally conductive and electrically insulating material and wherein the inductor has a strand of multiple-conductor electrically conductive wires wound in the form of a spiral, the support comprising, on its upper face, at least one spiral-shaped housing adapted to the receiving of said strand so as to optimize the transfer of heat between the inductor and the protective sheet.

BRIEF DESCRIPTION OF THE DRAWINGS

The invention as well as the various advantages that it gives shall be understood more clearly from the following description, made with reference to the appended FIGS. 1, 2 and 3 which give a schematic view in a vertical section of possible variants of an induction cooking heater according to the invention.

MORE DETAILED DESCRIPTION

For clarity's sake, the elements common to the figures bear the same references.

Figure 1:
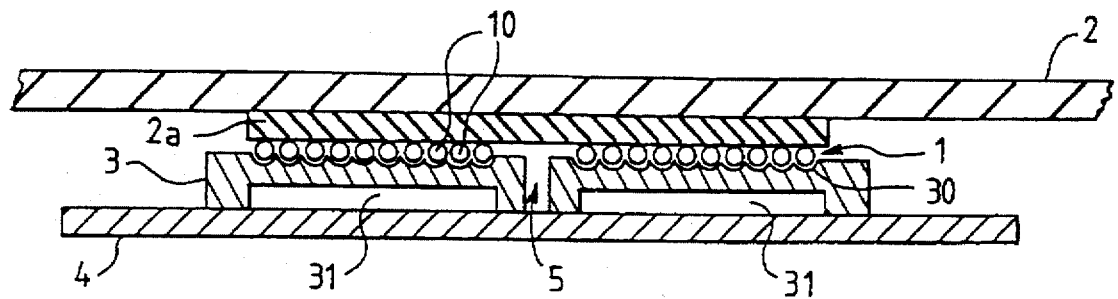
Figure 2:
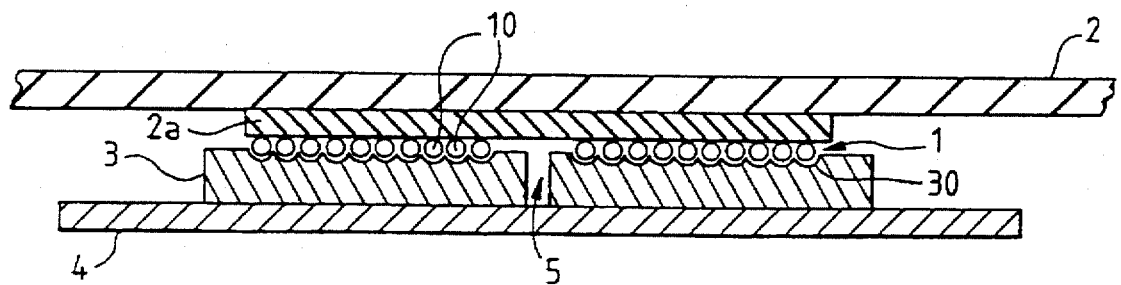

The induction cooking heater shown in FIGS. 1 and 2 conventionally has an inductor formed by a strand 1 of electrically conductive wires wound in a spiral. The sections made in the figures show the different turns 10 of the inductor. The inductor is placed beneath a plate 2, made for example of glass-ceramic designed to receive containers to be heated. The inductor is preferably separated from the plate by a layer 2a of thermal insulating material (ceramic paper or glass wool) so as to protect the inductor from the heating of the containers. The cooking heater also has, in a known way, an inductor support 3 comprising a magnetic material whose role is to focus the magnetic field created by the inductor towards the container to be heated and a sheet 4 of non-magnetic material, for example aluminium, whose role is to reduce the parasitic fields of the inductor to the minimum, particularly in order to protect the electronic devices (not shown) used to control the cooking heater. As is clearly indicated in FIGS. 1 and 2, the protective sheet 4 is in contact with the lower face of the support 3. The support 3 has an aperture 5 at its center corresponding to the center of the inductor. This aperture enables the passage, in particular, of a temperature sensor (not shown) to check the cooking.

According to a first characteristic of the invention, the support 3 is made of a thermally conductive and electrically insulating material so as to enable calorific transfer from the inductor 1 to the sheet 4. This sheet 4 may thus remove excess heat which is harmful to the inductor. The thermal conductivity of the material chosen is typically between 0.8 and 2 W.m$^{-1}$.K$^{-1}$, the materials commonly used having a thermal conductivity of the order of 0.3 W.m$^{-1}$.K$^{-1}$.

According to a second characteristic of the invention, the transfer of heat is optimized by placing each turn 10 of the inductor in a spiral housing 30 provided on the upper face of the support. Each turn 10 is thus in contact with the support on a circular portion and no longer at a single point as is the case when the inductor is simply placed on the upper flat face of a support. The housing 30 may be made by the printing of a spiral on the upper face of the support. Any other possibility consists of the direct molding of the support with its housing or again the over-molding of the inductor in its support.

In any case, the fact of placing each turn of the strand of the inductor in a housing that matches the shape of the turn has several advantages:

The first advantage that flows directly from the improvement of the calorific transfer is that it is henceforth possible to achieve a major reduction in the section of the strand for a level of high-frequency losses comparable with that of a standard strand.

Furthermore, the size of the housing that takes the different turns enables the very precise calibration of the diameter of the inductor.

The housing may enable electrical insulation between two consecutive turns.

It is also possible to give the inductor all the shapes desired (with contiguous or non-contiguous turns, an inductor in the form of a circular, elliptic or other kind of spiral). It is enough to provide for a housing with an appropriate shape on the support.

Furthermore, one and the same support may have several housings, each housing being adapted to a particular shape of inductor. In this way, the choice of the inductor that will actually be placed in one of the housings may be made at the time of assembly.

Furthermore, it is possible to manufacture a standard-sized inductor support and, at the time of assembly, make a larger support by the addition, around the standard support, of a complementary ring-shaped support also having a housing in the extension of the housing of the standard support.

All the above advantages lead to a significant reduction of the cost of manufacture of an induction heating cooker.

With respect to the material used for the support, various approaches may be envisaged depending on the precise functions assigned to the inductor support.

In the case of FIG. 1, the inductor support 3 conventionally has slots, for example radial slots within which there are positioned bars 31 of magnetic material, for example ferrite. To fulfil its function of thermal transfer according to the invention, the support may be made, in particular, of plastic charged with thermally conductive particles or refractory cement based on magnesia powder.

In the case of FIG. 2, the material chosen for the support enables this support to act simultaneously as a magnetic circuit refocusing the magnetic field lines on top of the inductor and as a means for removing heat towards the protective sheet 4. For this purpose, it is possible for example to make the support with ferrite powder and/or iron powder, bound for example by a plastic.

Furthermore, the sheet 4 which is used conventionally as a protection against parasitic radiation from the inductor and, according to the invention, as a means of dissipating calorific energy, may be advantageously sized so as to also serve as a support for the assembly formed by the inductor and the inductor support.

It will be noted that the appended figures are not aimed at showing the dimensions or the variety shapes that the different elements of the cooking heater according to the invention may have.

By way of an illustrative but not restrictive example, for a circular inductor with a total diameter of 180 mm, it is possible to provide for an inductor support which is also circular and has a total diameter of 184 mm with a thickness of 8.7 mm. Since the section of the strand can be reduced up to 2.5 mm$^2$, the housing may have a slightly greater width to receive this strand and a depth of about 3 mm.

Furthermore, the sheet 4 may also be circular and may preferably have a thickness substantially equal to 1.2 mm.

Figure 3:
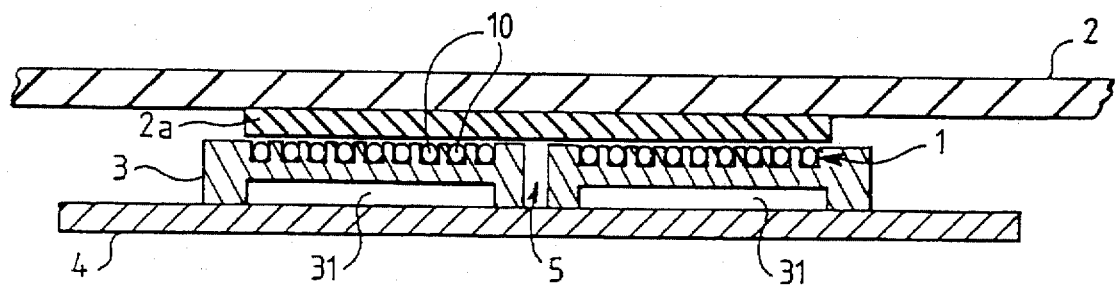

The link between the sheet 4 and the support 3 must enable efficient heat transfer. This may be done by the bonding of the support to the sheet, by over-molding or again by simple pressure. The shape of the imprint may, as shown in FIG. 3, be such that if the strand is made to enter the imprint by force, it will no longer come out of it. In this case, the width of the imprint must be smaller than the diameter of the strand which is compressed before being pushed into the imprint. This may enable the use of a standard basic wire, it being known that most of the other principles require the use of thermo-adhesive wire. In the case of over-molding, the sheet 4 advantageously has holes. During the over-molding operation, a part of the material used on the support goes through these holes and spreads around these holes, thus forming a sort of plug holding the support and the sheet.

The holes are preferably arranged on the surface of the sheet 4 so as to homogenize the distribution of the currents induced in the sheet 4 and thus improve the transfer of heat from the assembly. Naturally, the diameter and number of holes must be set so as not to penalize the role of magnetic screen fulfilled by the sheet.

What is claimed is:

1. An induction cooking heater of the type comprising at least one inductor, an inductor support comprising a thermally conductive and electrically insulating material having magnetic properties, and a protective sheet positioned beneath the support, in contact with the lower face of the support, wherein the inductor has a strand of divided electrically conductive wires wound in the form of a spiral, the support comprising, on its upper face, at least one spiral-shaped housing adapted to the receiving of said strand so as to optimize the transfer of heat between the inductor and the protective sheet.

2. An induction cooking heater according to claim 1, wherein said housing is made by the molding of the support.

3. An induction cooking heater according to claim 1, wherein said housing is made by printing on the upper face of said support.

4. An induction cooking heater according to claim 1, wherein said housing is made by the over-molding of the inductor in the support.

5. An induction cooking heating according to anyone of claims 1 to 4, wherein said magnetic properties result from ferrite bars held radially in the support.

6. An induction cooking heater according to claim 5, wherein the inductor support is made of plastic charged with thermally conductive particles.

7. An induction cooking heater according to claim 5, wherein the inductor support is a refractory cement based on magnesia powder.

8. An induction cooking heater according to claim 5, wherein the inductor support material has a thermal conductivity at least equal to 0.8 W.m$^{-1}$. K$^{-1}$.

9. An induction cooking heater according to any of claims 1, 2, 3, or 4, wherein the inductor support is made of a ferrite powder bound by a plastic.

10. An induction cooking heater according to claim 1, wherein the protective sheet is used to support the inductor and the inductor support.

11. An induction cooking heater according to claim 1, wherein the sheet has a plurality of holes distributed so as to homogenize the distribution of currents induced in said sheet.

12. An induction cooking heater according to claim 11, wherein the support is over-molded on the sheet, a part of the material of the support forming a plug through the holes to hold the plate and the support assembled.

13. An induction cooking heater according to claim 1, wherein the spiral-shaped housing has a width smaller than the diameter of the strand which must be made to enter by force.

* * * * *